Patented Dec. 22, 1931

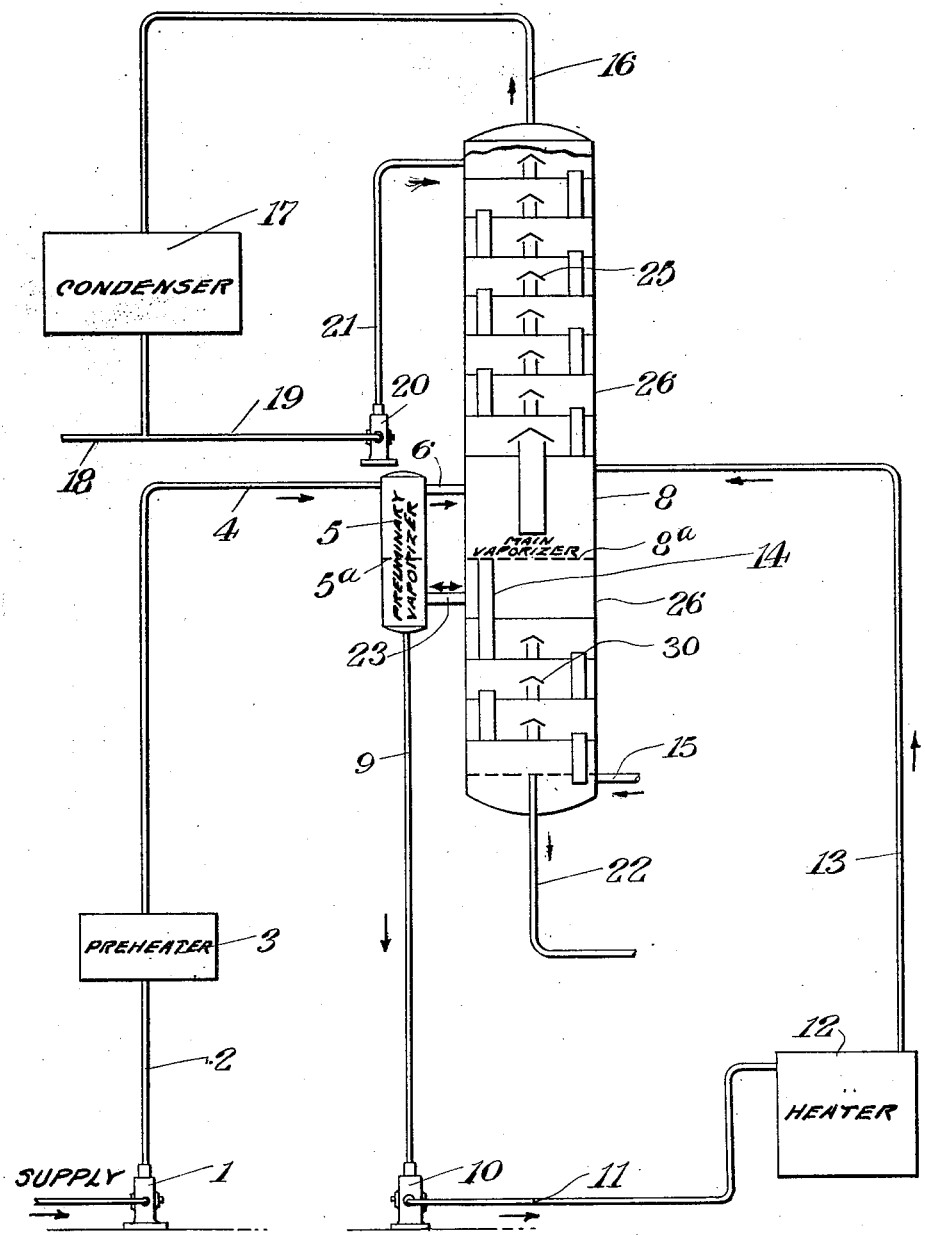

1,837,834

UNITED STATES PATENT OFFICE

WILLIAM A. PETERS, JR., OF SEATTLE, WASHINGTON, ASSIGNOR TO E. B. BADGER & SONS COMPANY, OF BOSTON, MASSACHUSETTS, A CORPORATION OF MASSACHUSETTS

APPARATUS FOR MAINTAINING A CONSTANT FLOW OF VARIABLE LIQUID RESIDUE FROM VAPORIZERS

Application filed April 19, 1927. Serial No. 184,892.

My invention relates to an improved apparatus for maintaining a constant flow of liquid residue from a vaporizer, particularly adapted for use when the liquid residue from said vaporized is adapted to be reheated for further use.

In the process of distilling volatile liquids, it is often desirable to heat the liquid to be distilled by passing it through a heat exchanger or a steam heater and then passing the heated liquid to a vaporizer where part of the desired overhead product is vaporized. The residue from said vaporizer may then be pumped through a second heater which usually comprises a series of tubes in a furnace, so that it can be heated to the desired temperature for the next step in its treatment, which is normally vaporization at a higher temperature in a second vaporizer. In order to keep the tubes of said tubular heater from overheating, a constant and even flow of liquid from the first vaporizer must be maintained. Usually this has been done by regulating a pump which transfers the liquid from the bottom of the first vaporizer through the heating tubes. This method requires that the pump be run at exactly the right speed to take care of the amount of residue accumulating in the vaporizer. If it runs too slowly the residual liquid will accumulate in the vaporizer and if it runs too fast, the residual liquid will be temporarily exhausted and the flow of liquid through the still tubes will stop and the tubes become overheated. The speed of the pump is usually regulated by a float control which is designed to keep a constant level in a liquid reservoir in the lower end of the first vaporizer. Such a float control is expensive and is difficult to operate smoothly. All controls of this description hitherto designed open nearly wide when the level in the reservoir rises a little and then close off when the level falls, thus causing the pump to operate more or less intermittently.

I have discovered that there is no great objection to mixing a small amount of the heavy liquid residue from a secondary vaporizer with the light liquid residue from a preliminary vaporizer or vice versa. In such cases I have found that the reservoir at the base of the first vaporizer can be directly connected to the reservoir at the base of the second vaporizer and that the pump which transfers the liquid residue from the first reservoir can be controlled closely enough to give a satisfactory operation without any float control. The amount of liquid residue in both vaporizers is variable though reasonably constant over relatively long periods of time. I have found that if the pump runs a little bit too fast for a particular interval the heavy liquid residue flows from the second reservoir to be mixed with the lighter liquid residue of the first, in which case the heavy liquid residue only becomes recycled. If the pump runs too slowly, light liquid residue will flow from the first reservoir to the second, which does no harm as the light portions thereof are readily vaporized in the second vaporizer, particularly if the second vaporizer forms an integral part of a fractionating column.

These and such other objects of my invention as may hereinafter appear will be best understood from a description of the accompanying drawing which illustrates a diagrammatic view of an equipment for topping petroleum in accordance with the teachings of my invention.

In the drawing, the crude petroleum or other stock is delivered by the pump 1 through line 2 to the heat exchanger 3 and line 4 to the preliminary vaporizer 5. The light vapors formed therein pass through the pipe 6 to a main vaporizer 8, which, in the preferred embodiment shown has a fractionating column 26 attached thereto, though if desired they may be led to the upper plates 25 of the fractionating column. The liquid residue from the vaporizer 5 flows through line 9 to the substantially constant speed pump 10, then through line 11 to the pipe still 12 and from pipe still 12 in line 13 to a main vaporizer 8 in the lower part of the fractionating column 26. A certain body of liquid residue is maintained in the base of this vaporizer 8, the excess or residue flowing down the pipe 14 to the lower plates 30 of the fractionating column 26 where the light materials may be stripped out of the liquid residue by means of steam introduced through the line 15. Thus, vapors, both from the preliminary vaporizer 5 and main vaporizer 8 pass up the column 26 where heavy material is separated out. The fractionated vapors from the column may be led through pipe 16 to condenser 17, from which the finished product may be withdrawn through the line 18 and a certain amount of the condensate in the condenser 17, if desired, returned to the column as reflux, through the line 19, pump 20 and line 21. The residue from the fractionating column 26 may be withdrawn from the base of the column through the line 22.

The drawing illustrates one type of well known apparatus to which my invention may be applied. The invention primarily includes connecting the lower part of the preliminary vaporizer 5 with the lower part of the main vaporizer 8, below the normal liquid levels 5ᵃ and 8ᵃ therein by the pipe 23. In operation, therefore, if the pump 10 takes more liquid residue from the vaporizer 5 than is furnished by the preliminary vaporizing operation, sufficient liquid will be drawn through the pipe 23 from the main vaporizer 8 to insure an even flow of liquid at all times through the tubes to the tubular heater 12. This recycling of the relatively heavy liquid residue from the main vaporizer does no harm. If a larger amount of liquid than usual should be temporarily run into the preliminary vaporizer 5 or if the pump 10 should slow down for any reason, some light liquid will flow from the preliminary vaporizer 5 into the main vaporizer 8. Even if the amount of light liquid drawn into the main vaporizer should retain some light material therein, it makes no difference since the light material would be distilled off and passed into the upper portion 25 of the fractionating column due to the higher temperature in the secondary vaporizer. Other portions would be removed by the steam introduced through the pipe 15 to the lower stripping portion of the column 26. In use I prefer to adjust the speed of the pump so that the flow of liquid in either direction through pipe 23 will be a minimum.

It will be apparent that thus by largely increasing the volume of liquid residue available to flow from the preliminary vaporizer 5, I have substantially insured an even flow of liquid therefrom at all times through the transfer lines 9, 11 and 13 and the pump 10 and tubular heater 12 interposed in them. The main purpose of securing an even flow from the first vaporizer is to permit a substantially constant speed pump to be used without the necessity for float regulator equipment and insure an even flow of liquid residue through the still 12.

If the pressures in the vaporizers 5 and 8 are equal, the liquid levels 5ᵃ and 8ᵃ will be approximately even. If they are not, the vaporizer having the greater pressure therein will have the lower liquid level. I therefore in the claims employ the word "balanced" when referring to the levels to indicate either even or as near even as the difference in pressures will permit.

It is understood that my invention is not limited to the specific apparatus shown and that various deviations may be made therefrom without departing from the spirit and scope of the appended claims.

I claim:

1. An apparatus for treating fluids comprising, in combination, a preliminary vaporizer, a main vaporizer mounted in relation to said preliminary vaporizer so as to have the normal variable liquid residue levels therein substantially balanced, means to feed preheated stock directly to the preliminary vaporizer, means to conduct the overhead from the preliminary vaporizer to the main vaporizer above the normal liquid level therein, means to conduct the bottoms from the preliminary vaporizer to the main vaporizer above the normal liquid level therein, a tubular heater interposed in said bottom conducting means to heat said bottoms before entering into the main vaporizer, a substantially constant speed pump in said bottom conducting means to transfer said bottoms through said tubular heater into said main vaporizer, and a pipe connecting said preliminary vaporizer with said main vaporizer below the normal liquid levels to keep said levels balanced and insure an even liquid flow from said first vaporizer through said pump and heater.

2. An apparatus for treating fluids comprising, in combination, a preliminary vaporizer, a main vaporizer mounted in relation to said preliminary vaporizer so as to have the normal variable liquid levels therein substantially balanced, means to feed preheated stock directly to the preliminary vaporizer, means to conduct the overhead from the preliminary vaporizer to the main vaporizer above the normal liquid level therein, a second means to conduct the bottoms from the preliminary vaporizer to the main vaporizer above the normal liquid level therein, a heating means interposed in said second means and a pipe connecting said preliminary vaporizer with the said main vaporizer below the normal liquid levels to keep said levels balanced and to insure an even liquid flow from said first vaporizer.

3. An apparatus for treating fluids comprising, in combination, a preliminary vaporizer, a main vaporizer mounted in relation to said preliminary vaporizer so as to have the normal variable liquid residue levels therein substantially balanced, means to feed preheated stock directly to the preliminary vaporizer, means to conduct the overhead from the preliminary vaporizer to the main vaporizer, means to conduct the bottoms from the preliminary vaporizer to the main vaporizer, a tubular heater interposed in said bottom conducting means to heat said bottoms before entering into the main vaporizer, a substantially constant speed pump in said bottom conducting means to transfer said bottoms through said tubular heater into said main vaporizer, and a pipe connecting said preliminary vaporizer with said main vaporizer below the normal liquid levels to keep said levels balanced and insure an oven liquid flow from said first vaporizer through said pump and heater.

4. An apparatus for treating fluids comprising, in combination, a preliminary vaporizer, a main vaporized mounted in relation to said preliminary vaporizer so as to have the normal variable liquid levels therein substantially balanced, means to feed preheated stock directly to the preliminary vaporizer, means to conduct the overhead from the preliminary vaporizer to the main vaporizer, a second means to conduct the bottoms from the preliminary vaporizer to the main vaporizer, a heating means interposed in said second means and a pipe connecting said preliminary vaporizer with the said main vaporizer below the normal liquid levels to keep said levels balanced and to insure an even liquid flow from said first vaporizer.

5. An apparatus for distilling fluids comprising in combination a preliminary vaporizer, a separate main vaporizer, means to conduct vapors from said preliminary vaporizer to said main vaporizer, a balancing connection between said vaporizers and below the liquid level therein, a feed line to said preliminary vaporizer, a transfer line between said preliminary vaporizer and said main vaporizer and a heater in said transfer line.

In testimony whereof, I have signed my name to this specification.

WILLIAM A. PETERS, Jr.